June 25, 1963  M. E. ERIKSEN  3,094,739
FISH SKINNING MACHINE
Filed Feb. 15, 1960  7 Sheets-Sheet 1
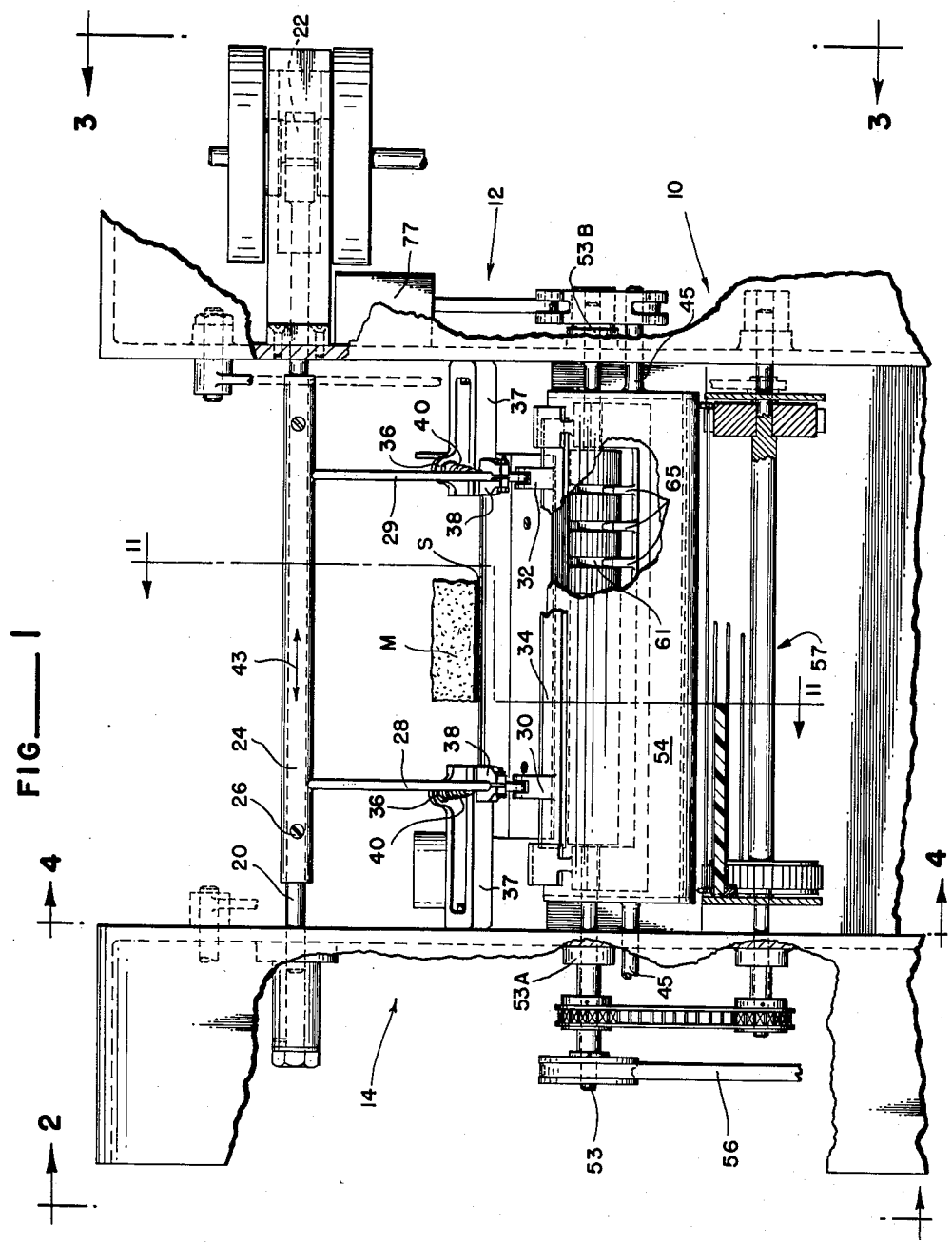
MONRAD E. ERIKSEN
INVENTOR.
BY Smith & Tuck June 25, 1963
M. E. ERIKSEN
3,094,739
FISH SKINNING MACHINE
Filed Feb. 15, 1960
7 Sheets-Sheet 2
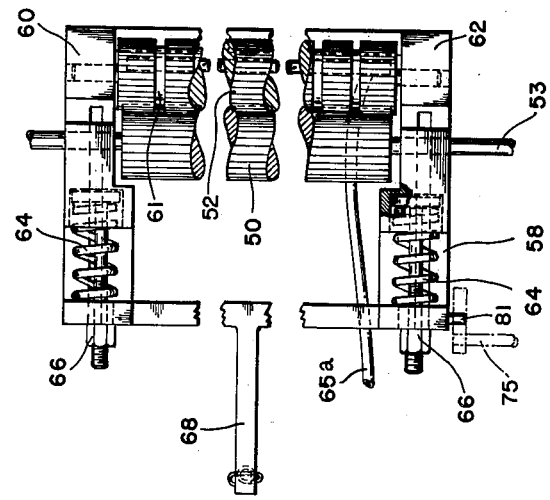
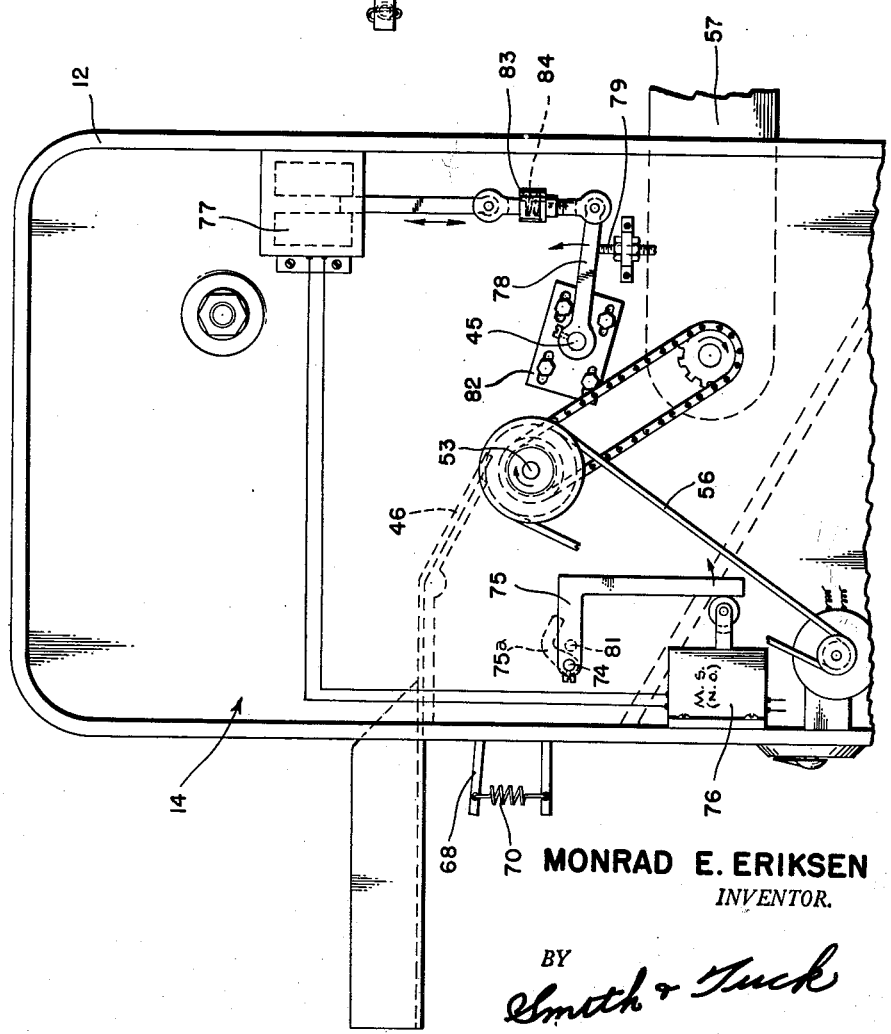
MONRAD E. ERIKSEN
*INVENTOR.*
BY
*Smith & Tuck*

June 25, 1963
M. E. ERIKSEN
3,094,739
FISH SKINNING MACHINE
Filed Feb. 15, 1960
7 Sheets-Sheet 3
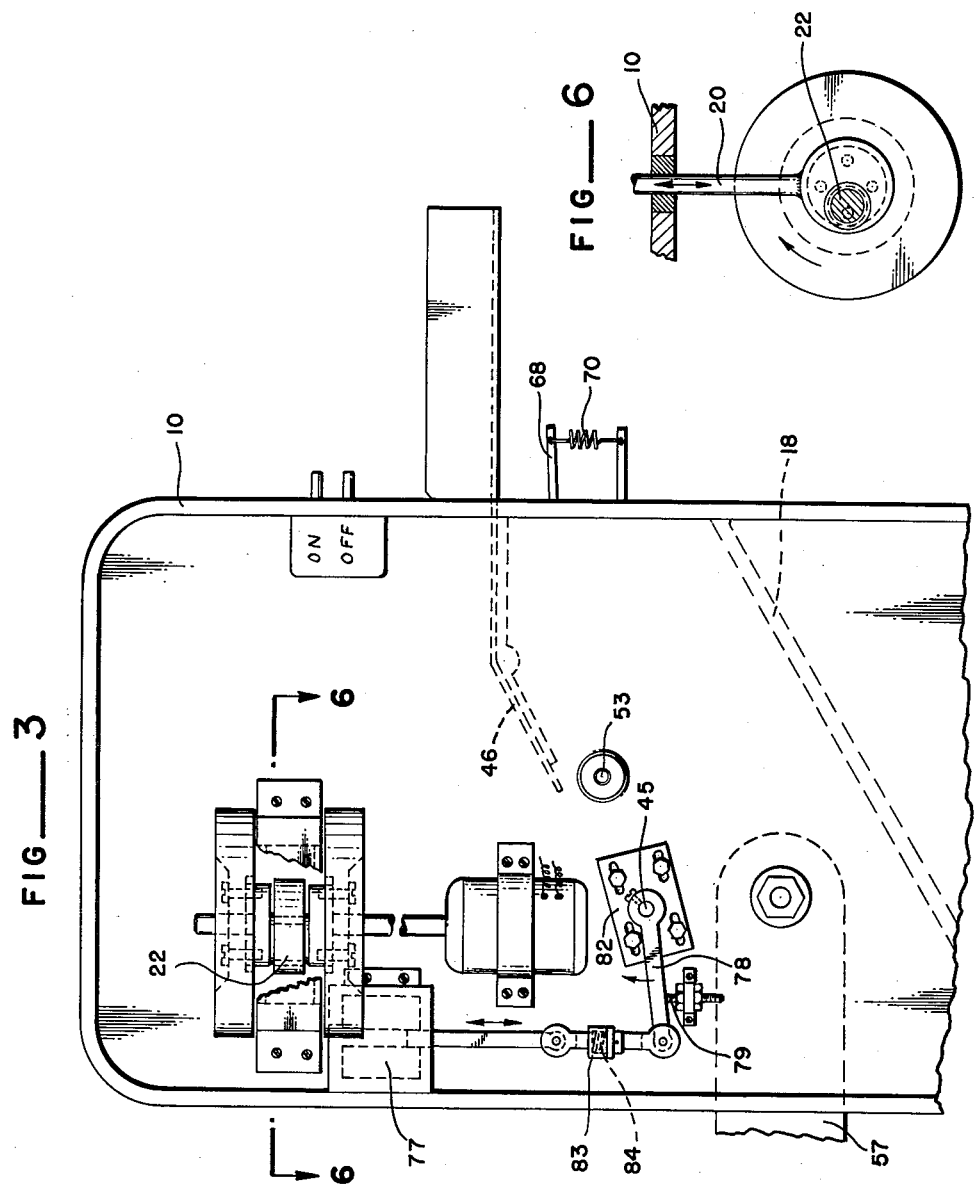
MONRAD E. ERIKSEN
*INVENTOR.*
BY
*Smith & Tuck*

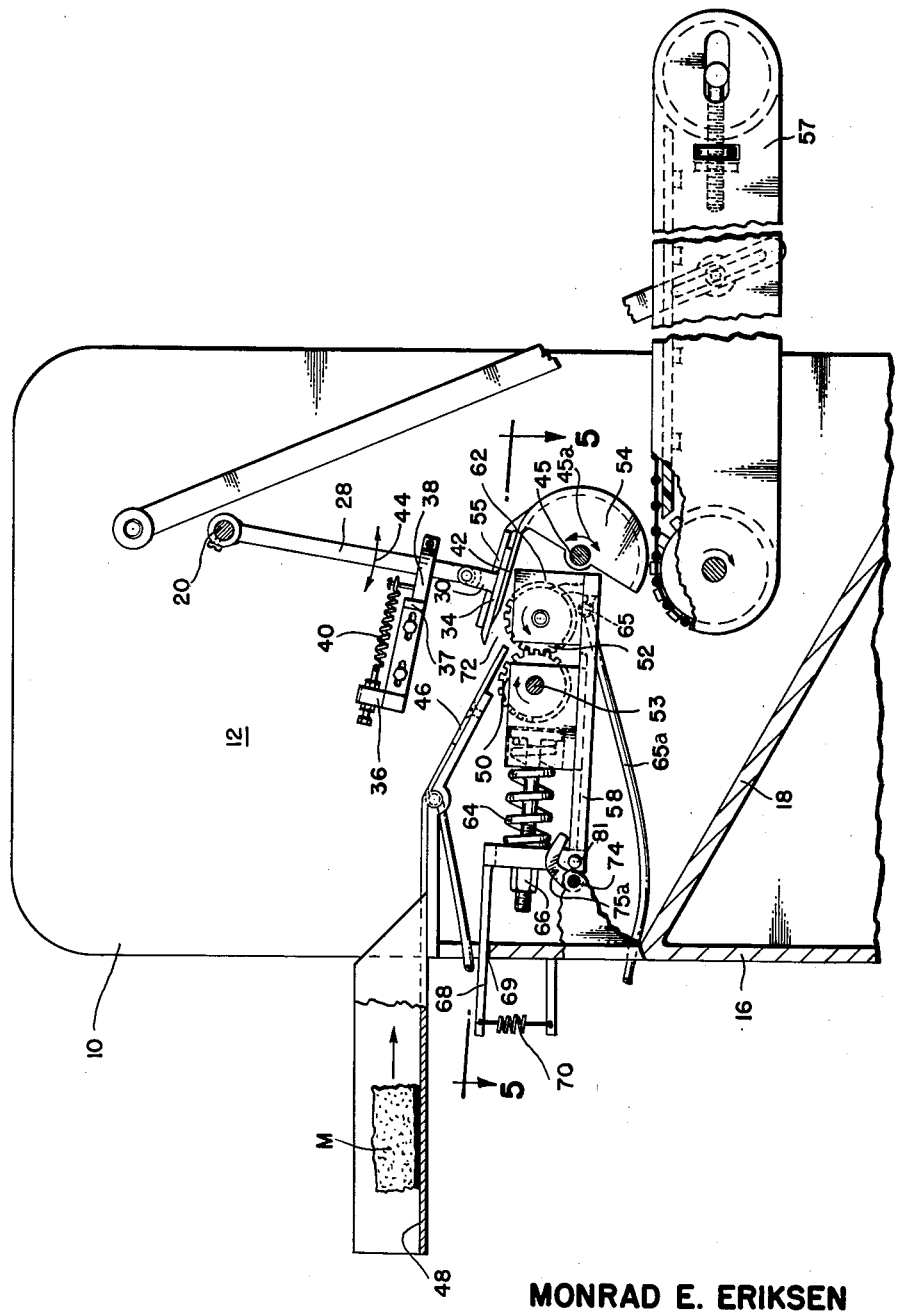

June 25, 1963  M. E. ERIKSEN  3,094,739
FISH SKINNING MACHINE
Filed Feb. 15, 1960  7 Sheets-Sheet 5

MONRAD E. ERIKSEN
*INVENTOR.*

BY *Smith + Tuck*

June 25, 1963   M. E. ERIKSEN   3,094,739
FISH SKINNING MACHINE
Filed Feb. 15, 1960   7 Sheets-Sheet 6

MONRAD E. ERIKSEN
*INVENTOR.*

BY *Smith & Tuck*

June 25, 1963

M. E. ERIKSEN 3,094,739

FISH SKINNING MACHINE

Filed Feb. 15, 1960

MONRAD E. ERIKSEN
*INVENTOR.*

BY
*Smith & Tuck*

3,094,739
FISH SKINNING MACHINE
Monrad E. Eriksen, Seattle, Wash., assignor, by mesne assignments, of one-half to said Eriksen, and one-half to O. Clayton Helton, both of 5342 Ballard Ave. NW., Seattle, Wash.
Filed Feb. 15, 1960, Ser. No. 8,543
3 Claims. (Cl. 17—2)

This present invention relates to the general art of fish and meat skinning devices. More especially this present equipment is particularly adapted for removing the skin from fish fillets and from pieces of fillets from the larger fishes that have been cut to commercial sizes.

This present machine therefore must have a wide range of adjustment so that it can successfully handle fish and meat pieces which vary widely in their size and conformation and more especially in the bonding properties of the skin to the flesh of the fish or meat products. To successfully handle a wide range of skinning oeprations it is therefore necessary to have in addition to various feed adjustments, the ability to give various cyclic movements to the knife structure that actually does the skinning. Particularly in the handling of fish, it is increasingly becoming more necessary that the fish be supplied to the retailer in a form which can be packaged in family sized quantities in order that the fish may be sold in self-service establishments. This general change in the method of merchandising fish requires therefore that the processor of the freshly caught fish must not only clean the fish but must normally reduce the fish to two fillets which represent the edible portion of the fish and is free from all waste such as the head, entrails and usually the complete bone structure. When the retailer obtains fish in fillet form he can then wrap it in packages of a size which his past experience in his community has indicated is most acceptable to his customers.

When fish are filleted and particularly when they are cut into smaller pieces they lose the appearance of the fish as a whole and it therefore becomes very desirable to remove the skin in order to complete the preparation and present the fish meat as a clean looking appetizing food product. This requirement necessitates providing fish skinning machines that will handle fish quickly with the very minimum of waste of the edible meat and which will do this with mechanical means that will keep the cost of this operation well within commercial limits so that the fish in its final form will be a competitive food product when considered from the point of view of the housewife. It is believed that this present machine provides a satisfactory solution of this problem.

My present machine is arranged to overcome many of the deficiencies noted in former machines. The equipment is arranged to work at high speed so that small fillets or small pieces of large fish can be handled in large quantities so that the poundage passed through the equipment during a working day is very high. As a result of this high speed operation a different kind of operation is possible in which instead of actually cutting the skin from the flesh of the fish the element that takes the place of the conventional knife really becomes a means for insuring that the flesh is uniformly, fully and smoothly pulled off of the skin so that the resulting skinned fish surface is very appetizing in appearance without any noticeable breaks of any kind in the outer surface. This operation also insures that all of the edible flesh is saved. In this operation, the knife, acting more as a presser element, will last for long periods without any necessity of resharpening the same.

High speed operation imposes many unusual stresses on a piece of equipment of this order and, where these are encountered, resilient means is provided in order that adequate clearance may be automatically obtained so that there will be no wedging of the shafts by unanticipated thick skin portions and the like. Means are further provided to insure that skin particles, or flesh, or clotted blood will not adhere to the high speed skinning elements. This feature adds materially to the long life, to the speed of operation and the wholesome appearance of the final product of this machine.

The principal object of this present invention is to provide a fish or meat skinning machine that will operate for long periods at a high rate of speed.

A further object of this invention is to provide means to insure that the machine can accommodate itself to unusual conditions without in any way injuring the high speed components of this equipment.

A further object of this invention is to provide means to insure at all times that the high speed operating parts of the equipment will be maintained free of various types of debris, torn-off fragments of skin and other items that normally would not pass freely between the high speed rolls that perform the principal skinning functions of this machine.

A further object of this machine is to provide means whereby this machine will automatically accommodate itself to fish skins of slightly varying thicknesses.

A further object of this equipment is the provision for manually changing the setting of the machine when it is in operation, thus making it possible to adapt the machine to changing conditions or various kinds of fish without slowing down or stopping the production line.

A further object of my present machine is to provide in the cutting knives means for giving slicing cuts which is accomplished by providing several different movements to the actual knife as the fish is being fed against it.

Further objects, advantages and capabilities will be apparent from the description and disclosure in the drawings or may be comprehended or are inherent in the device.

FIGURE 1 is a vertical view taken from the discharge side of the machine and with certain parts broken away and others shown in section to better illustrate the construction of the machine.

FIGURE 2 is a side elevation taken as viewed from the plane of 2—2 of FIGURE 1.

FIGURE 3 is a side elevation from the opposite side of the machine as viewed from line 3—3 of FIGURE 1.

FIGURE 4 is a vertical cross sectional view taken along the line 4—4 of FIGURE 1.

FIGURE 5 is a fragmentary top plan view illustrating the skin handling rolls and the pressure means employed therewith with certain parts omitted to simplify the view for clarity.

FIGURE 6 is a horizontal sectional view taken along the line 6—6 of FIGURE 3.

Figure 7:
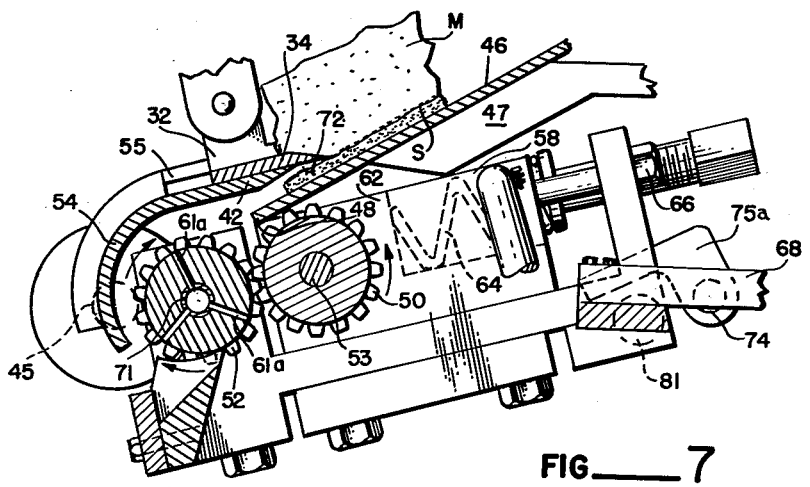
FIGURES 7, 8, 9 and 10 are sectional views taken substantially along the line 11—11 of FIGURE 1 showing the sequential operations of entering a fish fillet into the skinning elements and showing the same on an enlarged scale and employing a modified form of water supply means to the power driven feed roll.

Referring to the drawings, throughout which like reference numerals indicate like parts, the numeral 10 designates generally the frame of my machine which is preferably cast from metal in order to provide the rigidity desirable for high speed operations. Main frame 10 is normally provided with a hinged cover on each side which have not been illustrated in FIGURE 1 in the interest of keeping the drawings as simple as possible. The frame is made with what is, in effect, a channelized cross section on both sides of the machine and the recess thus formed within frame members 12 and 14 provide, in association with the cover for each, an adequate housing for the working parts which control the functioning of the knife and the fish skin handling equipment and which might be injured by water present during operation of the machine. The two sides of the frame are tied together by transverse webs as 16 and 18.

Horizontally disposed between frame members 12 and 14 is the cutting knife assembly. This assembly is positioned by means probably best shown in FIGURES 1 and 4 and consists of a reciprocating shaft 20 driven by a suitable crank and connecting rod means 22. Disposed upon shaft 20 is a tubular sleeve 24 which is fixedly positioned longitudinally on shaft 20 by means of suitable bolts 26. Depending downwardly from sleeve 24 are two spaced and parallel knife positioning struts 28 and 29. At the lower ends of the struts are hingedly secured bosses 30 and 32, which in turn are fixedly secured to the cutting or upper knife 34. This means of coupling knife 34 to crank 22 makes it possible to give a reciprocating stroke also to the knife, of the same magnitude as the reciprocation of shaft 20. Having the struts pivotably connected to bosses 30 and 32 permits knife 34 to rock transversely so as to adapt the knife to coaction with other parts shown in greater detail in FIGURES 7, 8, 9 and 10.

Referring now to FIGURE 4, it will be observed that strut 28 and strut 29 which is not shown are disposed to rock to a limited degree upon shaft 20 and this pivoting is controlled by a stop bracket 36 and associated parts wherein bracket 36 is adjustably mounted one on each of the inner faces of the frame members 12 and 14 and provides the abutment 37 for the preferably plastic stop member 38. Members 38 are secured to struts 28 and 29 and provide definite abutting stop members which are under some compression by the tension spring 40. Adjustment can therefore be made so that the exact positioning of the knife in its limited revolution on shaft 20 can be controlled by the adjustment of bracket 36.

Disposed below knife 34 is the under knife 42. The upper knife 34 and the under knife 42 normally operate in engagement with each other, as is illustrated in FIGURES 7, 8, 9 and 10, excepting of course that the upper knife 34 is subject to the movements indicated in FIGURE 1 by the double-headed arrow 43 and in FIGURE 4 by the double-headed arrow 44. There is still a further movement which occurs when the under knife is revolved relatively small amounts, but in both directions, as indicated by the arrow 45a in FIGURE 4. It will be noted that knives 34 and 42 are oppositely sharpened so that they actually tend to come together to form a single sharp cutting edge when knife 34 is at the full limit of its rearward movement. The under knife 42 is sharpened so that it is normally substantially parallel with the strike plate 46.

Figure 9:
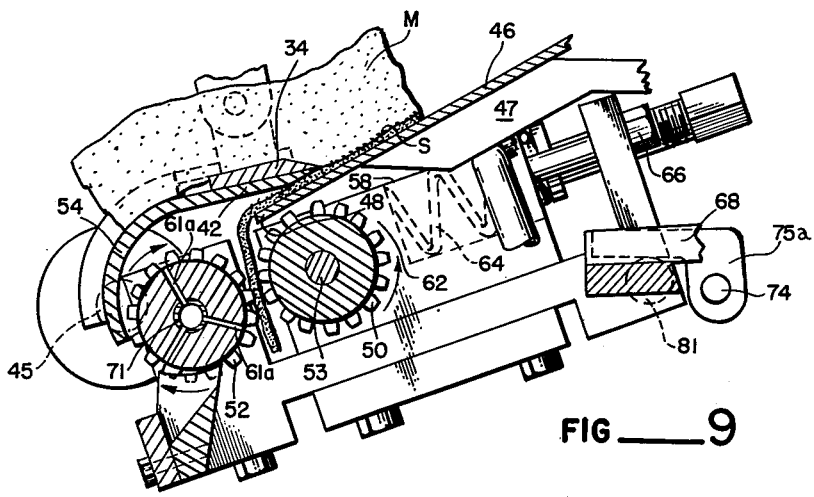
Figure 11:
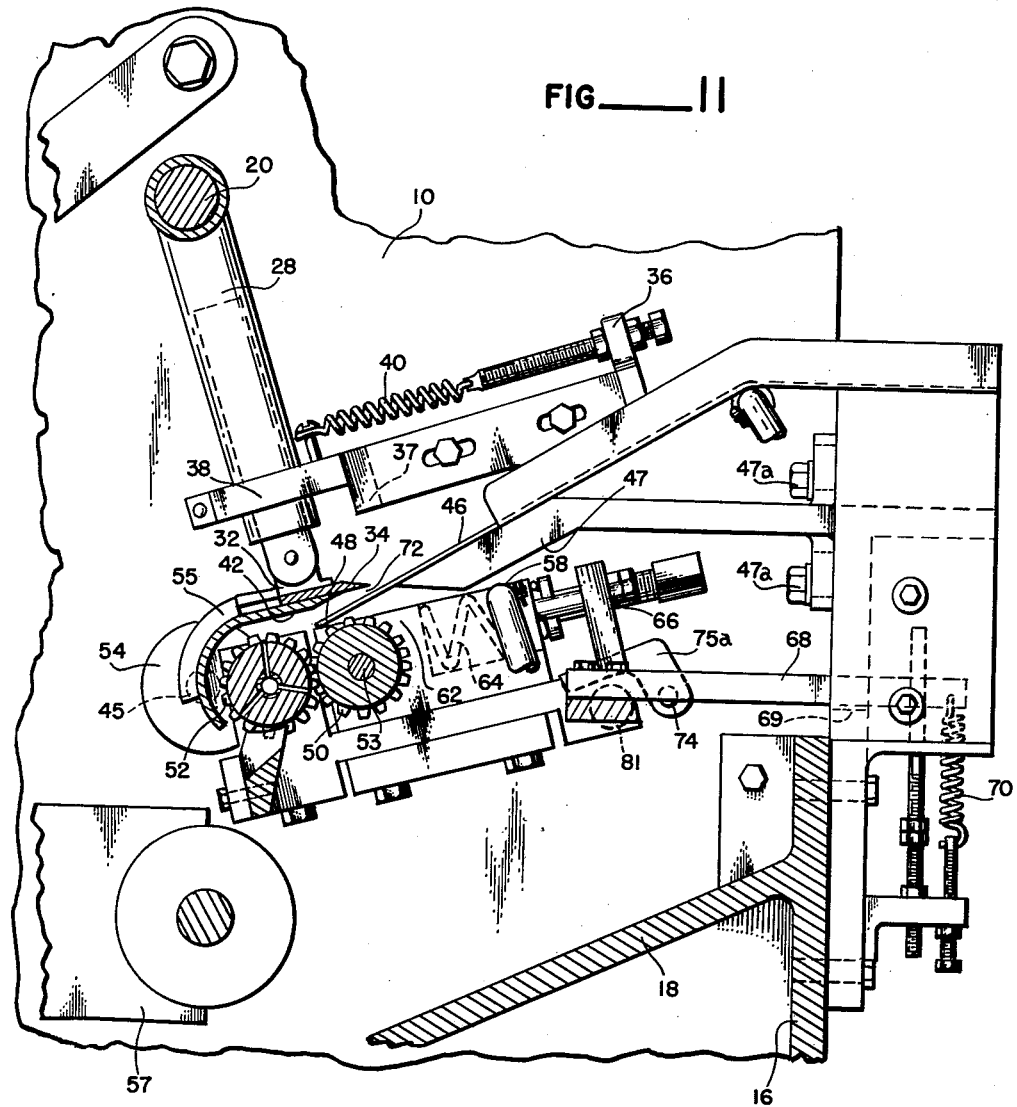
FIGURE 11 is a fragmentary view showing certain details of the knife assembly on enlarged scale and in section, taken along the line 11—11 of FIGURE 1.

The strike plate 46 is capable of limited vertical adjustment, which adjustment includes the feed table 48 and its associated parts. Stop 47 is separately adjustable to provide a downward limit or stop for plate 46. As shown in FIGURE 11 a plurality of bolts 47a disposed in vertically slotted holes are adequate. It is desirable that adjustments be provided so that the extreme end of the strike plate, as indicated at 48, can be properly positioned with respect to the feed rolls 50 and 52. Further, it is necessary that the under knife blade 42 be capable of bearing on strike plate 46 as it must at certain stages of the operation when it is necessary to hold the skin of the fish with the under knife while the upper knife 34 is cutting the skin S loose from the meat M. The under knife is pivoted upon shaft 45, which is restricted to limited rotation and has a semicircular guide means 54 which is employed to guide the meat M after it has passed over knife 34 and to deposit the same onto the discharge conveyor 57. It will be evident that as the under knife moves as indicated by arrow 45a the angle of the under knife proper 42 will change somewhat and it is necessary that knife 34 follow it, and to this end struts 28 and 29 are pivotably connected to the knife as is illustrated in FIGURES 1 and 4. Special guide means is provided at 55 at each end of the knife so as to insure that it conforms at all times to the under knife and moves with it as far as the revolution about shaft 45 is concerned. When knives 34 and 42 form a common cutting edge, as shown in FIGURE 9, the longitudinal or reciprocating movement of knife 34 cleans the cutting edge against the edge of knife 42 and removes small particles leaving knife 34 in condition to most effectively cut small pieces of thin or very soft skin.

Disposed in meshing engagement, substantially under end 48 of the strike plate 46, are the two feed rolls 50 and 52. These rolls are preferably made in the form of elongated spur gears and in operative engagement with each other, but preferably arranged with clearance considerably greater than is normally desirable in a straight gear drive, this being desirable in order that the fish skin of varying thickness can pass through between the gears. When the thicker skins are encountered, however, it is necessary that resilient means be provided so that the two feed rolls can be physically separated sufficiently by the skin passing through so that the skin will with certainty pass through in a proper manner and not be cut. Resilient means employed are probably best shown in FIGURES 4 and 5. Feed roll 50 is mounted upon shaft 53 which may be driven by any suitable means, as by the belt 56, connected in turn to a suitable source of power. Shaft 53 is revolvably mounted in bearings, not shown, but supported within frame members 12 and 14 on bearings 53B and 53A respectively as shown in FIGURE 1 and provides a pivot for the feed roll frame 58. Frame 58 is provided with a guideway for the movable bearings 60 and 62 which are backed up by the compression springs 64, which springs in turn are adjustable for tension by means of the bolt and nut arrangements 66.

To provide means for preventing an accumulation of debris a plurality of spaced annular grooves 61 is provided in said driven roller. A water nozzle 65 is provided for each groove and water, under pressure, is supplied to the nozzles by a water line 65a.

For certain types of fish a hollow shaft 71 is provided for roller 52 with radial water discharge passageways 61a leading from hollow shaft 71 to the annular grooves 61 and instead of water jets 65.

An extension arm or handle 68, which is formed as part of frame 58, engages a downward stop 69 which is spring biased by spring 70 to hold it in engagement with the stop.

Figure 8:
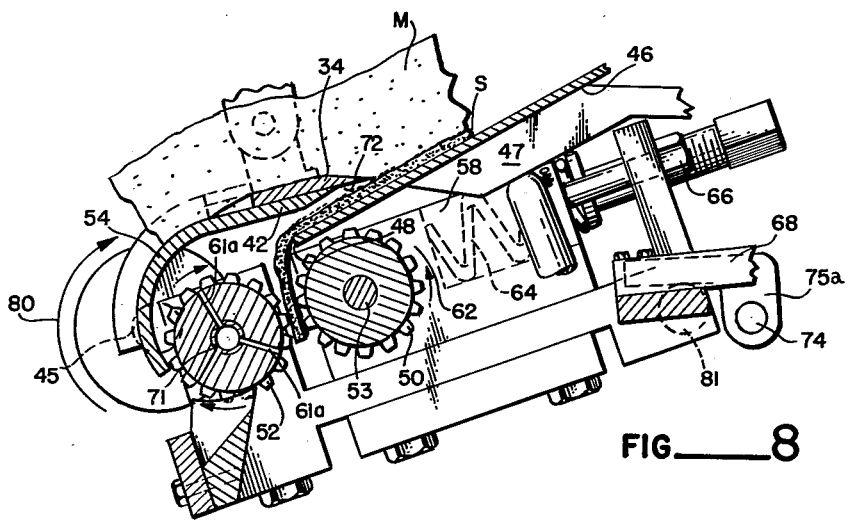
Figure 10:
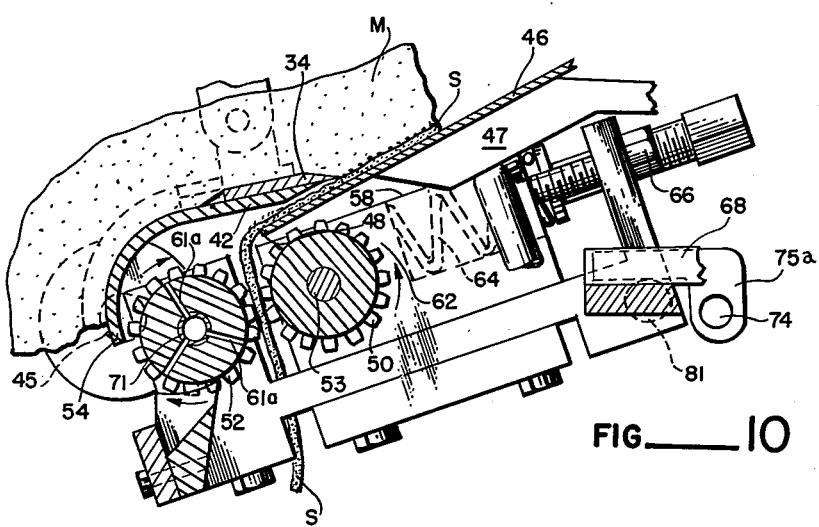

In referring to FIGURES 7, 8, 9 and 10 and specifically to FIGURE 7, as the fish piece M is fed down the incline, formed by strike plate 46, there will be considerable clearance at 72 so that the knife will engage the fish piece above skin S and commence severing it from the meat. It will be noted that there is very little clearance between roll 50 and the under-side of plate 46; consequently the teeth of roll 50 engages the skin and carries it in the direction indicated by the revolution of roll 50 and thus carries it around to the point of engagement with roll 52, after which the combined effort of the two rolls 50 and 52 pass the skin down through between the rolls, after the showing of FIGURES 8 and 9. In FIGURES 8, 9 and 10 it will be noted that the clearance between the strike plate 46 and roll 50 is increased, and also the positioning of upper knife 34 and under knife 42 has been advanced towards the meat. This is an operation that occurs each time a new piece of fish is fed up to the knife, and the mechanism to make this transfer is probably best illustrated in FIGURE 2. As the skin engages knife 34 and is cut from meat M the added friction of skin S entering between gears 50 and 52 introduces a marked friction or braking effect which tends to lock the drive roll 50 to frame 58 and thereby as roll is positively driven by shaft 53 it carries pivoted frame 58 with it, overcoming the biasing effect of spring 70. Spring 70 is shown in FIGURES 4 and 11.

Referring to FIGURES 7, 8, 9 and 10 a series of sequential steps are performed. The first is the partial revolution of the roller assembly, as mounted on frame 58, around the supporting shaft 53. This displacement is best seen in FIGURES 7 and 8 in which it will be noted that the upper margin of frame 58 is moved upwardly with respect to the fixed stop 47 and gear shafts 50 and 52 are displaced by the introduction of a piece of skin S between the gear teeth.

The next step is the operation of the micro-switch 76, through the three part actuating arm 75 by detent 81 of frame 58. This step energizes the solenoid 77 which through suitable linkage partially revolves shaft 45 and tips the cutting edges of knives 42 and 34 downwardly. In this position the under knife 42 is pressing the skin S that has been severed from meat M, against plate 46. This step insures that a minimum of meat will be left on the skin and that knife 34 will have a firm wall of meat to work against as it moves from side to side in making its shearing cut.

As lever 68 moves upwardly it leaves stop 69, and the detent 81, which is secured to frame 58, engages the crank 75a which is connected by a short shaft 74 to the operating arm 75 of the micro-switch 76. This completes an electric circuit which energizes solenoid 77, causing an upward movement of the core of the solenoid and raising arm 78 off of the adjustable stop 79. This has the effect of partially revolving knife shaft 45 in the direction of arrow 80 in FIGURE 8 and we have a change of position accomplished by frame 58 between that shown in FIGURE 7 and that shown in FIGURE 8. This change is evidenced by the added clearance of gear 50 below plate 46 and the resulting change of knives 34 and 42 with respect to strike plate 46 as shown in FIGURE 9. In order to accommodate the different thicknesses of fish skin encountered and be able to move it under knife 42 and automatically upper knife 34, a manual adjustment is provided along the line connecting the center of the knife shaft 45 and the shaft 53 supporting and driving roll 50. One form of adjustment means is shown at 82 in FIGURE 2. Duplicate solenoids 77 are preferably employed, one on each side of the machine, both of which are energized by limit switch 76. A duplicate solenoid is illustrated in FIGURE 3 with its associated parts. As the action of a solenoid is unpredictable to a degree as to velocity and extent of movement, an adjustable clevis assembly is employed at 83 which provides the tensing spring 84 and a threaded adjusting means to control the length of the linkage between the solenoid core and lever 78.

It is believed that it will be clearly apparent from the above description and the disclosure in the drawings that the invention comprehends a novel construction of fish skinning machine.

Having thus disclosed the invention, I claim:

1. A fish skinning machine, comprising: a main frame having two side members of open box form to form housings and vertically pivoted covers therefore; a power driven shaft revolvably mounted in bearings supported by said frame; a horizontally disposed driving roller fixedly secured on said power shaft and having an elongated gear tooth surface; a coacting driven roller having an elongated gear tooth surface driven by said driving roller, revolvably mounted in bearings resiliently supported and disposed in parallel, substantially horizontal relationship to said driving roller; said driven roller having spaced annular grooves in its surface and water jets disposed to direct water into said grooves; a knife assembly consisting of an upper knife, an under knife and a strike plate; a power driven reciprocating shaft journaled in the upper portion of said main frame; said upper knife having spaced apart lugs on its upper surface and a tubular sleeve revolvably positioned upon but adapted to move longitudinally with said reciprocating shaft positioned above said knife; downwardly directed struts fixedly secured to said sleeve, pivotably connected to said lugs and adapted to give longitudinal movement to said upper knife; said under knife blade disposed in engagement with the underside of said upper knife and mounted for limited rotation on a shaft disposed below said knives and journaled in said frame side portions; guide means secured to said under knife adapted to engage the opposite ends of said upper knife and retain it in engagement with said under knife blade; said strike plate forming the downwardly directed delivery end of a feed table and terminating at a point substantially above the meeting line of said rollers; said under knife blade being sharpened at a bevel substantially parallel to the upper surface of said strike plate; said upper knife sharpened in the opposite direction so the under and upper knives may form a single common cutting edge.

2. A fish skinning apparatus, comprising: a frame for supporting the various parts in operative relationship and serving as a protective housing for certain other of the coacting parts; a power driven roller revolvably mounted in bearings supported by said frame and having a longitudinally fluted surface; a second roller, revolvably mounted in bearings supported by said frame by resilient means and disposed in parallel, substantially horizontal relationship to said power roller; said second roller having longitudinal flutes adapted to coact with the fluted surface of said power roller; said second roller further having an axially disposed water passageway and radially disposed water passageways between said axially disposed passage and said longitudinal flutes; means for supplying water to said second roller; a transversely disposed straight upper knife; a reciprocating and oscillating pivot shaft disposed above said knife; struts disposed at each end of said upper knife and supporting said knife from said oscillating pivot shaft as it revolves to a limited degree about said pivot shaft; an under knife pivoted on a shaft disposed below said upper knife, said under knife having guides at each end adapted to guide said upper knife as it moves on the upper surface of said under knife and to hold it in working contact with said under knife; means for varying the position of the cutting edge of said under knife automatically and crank means for giving said upper knife limited reciprocation along its length and means for giving it transverse movement with respect to said under knife; a downwardly directed fish feeding means; means adapted to guide fish from the fish feeding means and cause them to engage said upper knife and said lower knife and the skin loosened thereby to enter between the power driven roller and the second roller and means to carry the skinned fish away from the machine.

3. The subject matter of claim 2 in which said resilient means for supporting said second roller consists of a pivotably supported frame having fixed bearings for the drive shaft of the power driven roller which shaft also serves as a pivot for said pivotable frame; a frame spring biased and so balanced that when fish skin enters between said rollers said spring biasing is overcome and said pivotable frame permitted to make a limited rotation about said power shaft thereby actuating means to revolve said knives toward said fish feeding means.

References Cited in the file of this patent

UNITED STATES PATENTS

| | | |
|---|---|---|
| 2,605,495 | Daniels | Aug. 5, 1952 |
| 2,856,630 | Lewis | Oct. 21, 1958 |

FOREIGN PATENTS

| | | |
|---|---|---|
| 1,175,752 | France | Nov. 17, 1958 |